No. 776,391. PATENTED NOV. 29, 1904.
C. H. GIESE.
COUPLING FOR DRILLS.
APPLICATION FILED JULY 20, 1904.
NO MODEL. 2 SHEETS—SHEET 1.
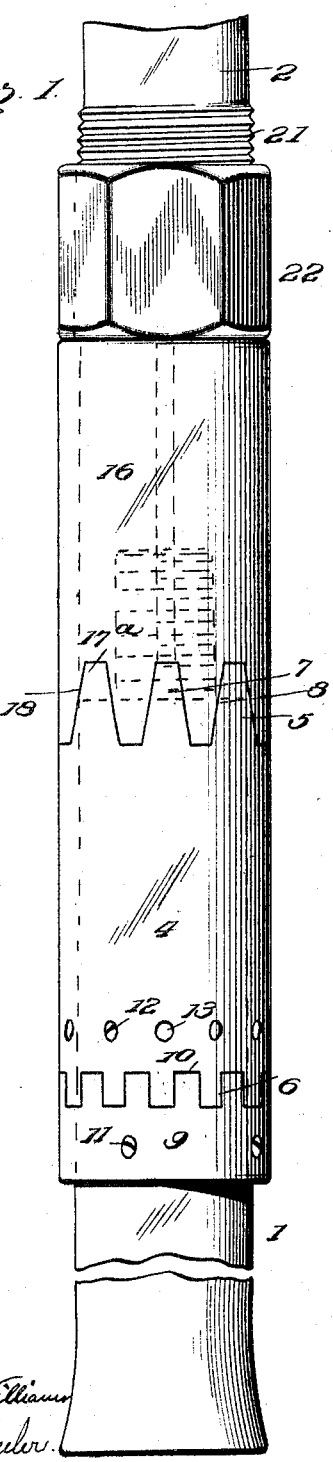
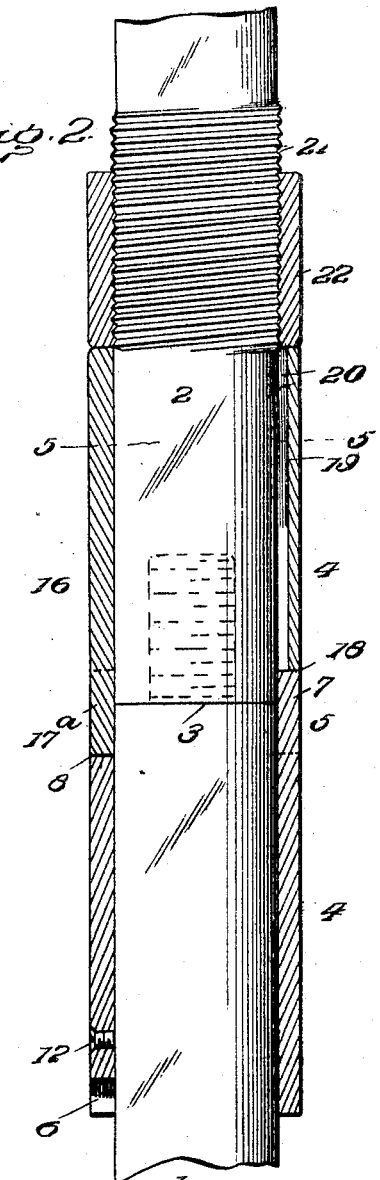
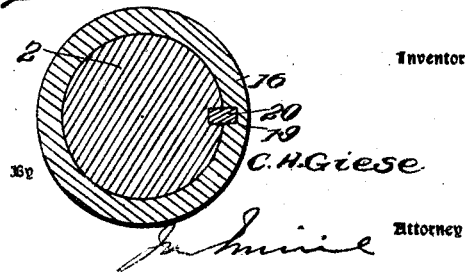
Witnesses
Inventor
C. H. Giese
Attorney

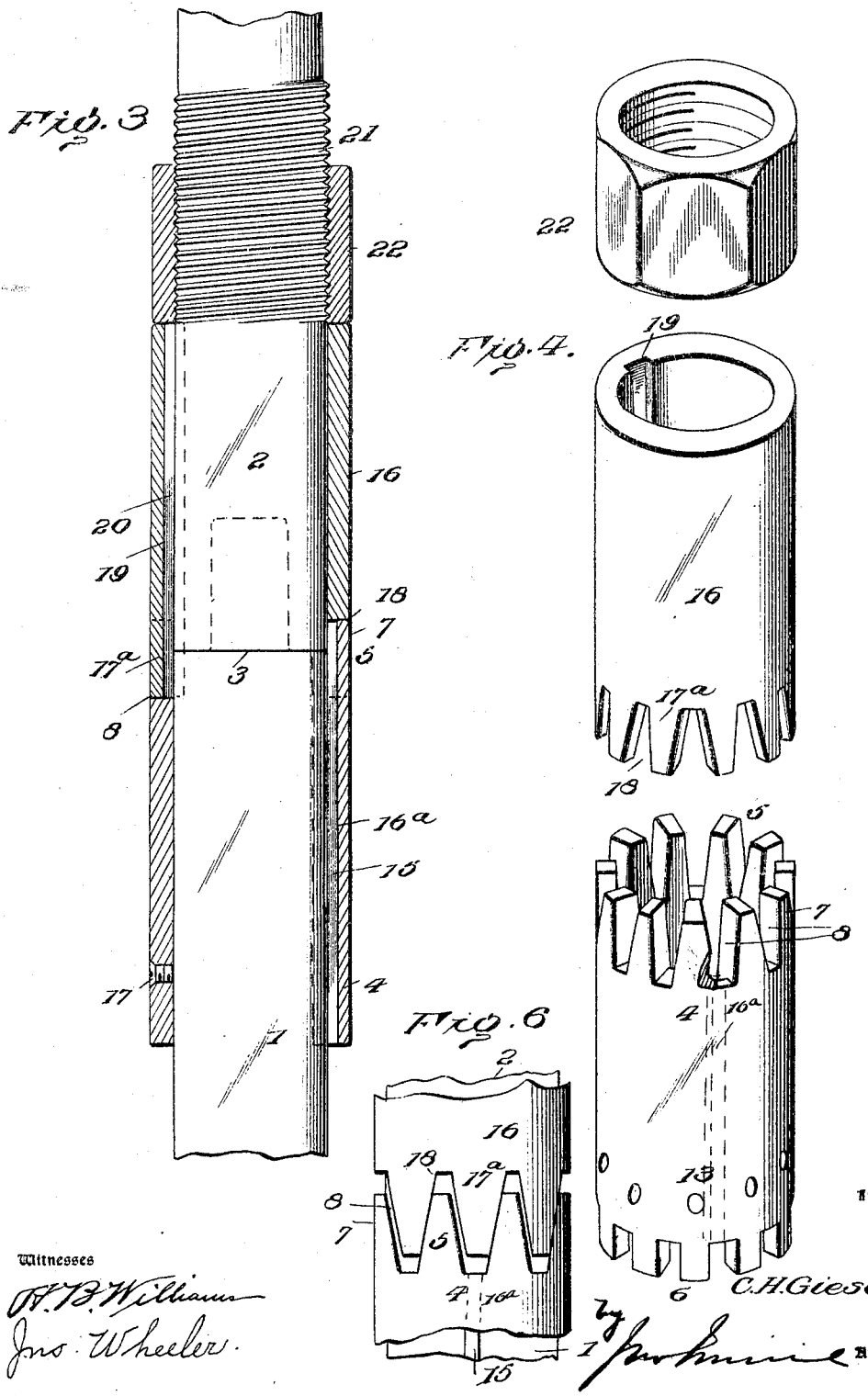

No. 776,391. Patented November 29, 1904.

UNITED STATES PATENT OFFICE.

CHARLES H. GIESE, OF TORONTO, KANSAS.

COUPLING FOR DRILLS.

SPECIFICATION forming part of Letters Patent No. 776,391, dated November 29, 1904.

Application filed July 20, 1904. Serial No. 217,424. (No model.)

*To all whom it may concern:*

Be it known that I, CHARLES H. GIESE, a citizen of the United States, residing at Toronto, in the county of Woodson and State of Kansas, have invented certain new and useful Improvements in Couplings for Drills; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in devices for positively locking a well-boring drill to its stem.

The prime object of the invention is to provide a fixed clutch member on the drill and a movable clutch member locked against independent rotation on the drill-rod, the clutches engaging each other adjacent and overlapping the joint of the rod and drill, and a locking-nut to hold the clutches together.

Other objects and advantages will be hereinafter referred to and be particularly pointed out in the claims.

In the drawings, Figure 1 is a side elevation of a drill and rod connected by my invention. Fig. 2 is a similar view showing the invention in section and also a slight modification. Fig. 3 is a view similar to Fig. 2, but showing a further modification. Fig. 4 is a perspective view of the invention detached. Fig. 5 is a cross-section on line 5 5, Fig. 2. Fig. 6 is a detail view showing the teeth of the clutch members loosely engaging each other.

The numeral 1 represents a well-drill of any known construction, and 2 the drill-rod, joined together at 3, as with a screw-joint.

Experience has demonstrated that a drill and its rod will gradually work apart during the operation of drilling if some specific means are not provided to lock the two elements together. It is to overcome the difficulty incident to this separating of parts, especially when the drill is down quite a depth in the ground, that I have devised my improvement.

On the drill is mounted a cylindrical clutch member 4, provided at its upper edge with a clutch-face 5 and on its lower edge with a series of teeth 6. The clutch-face 5 is composed of a series of alternately-arranged beveled teeth 7 and seats 8, the function of which will be hereinafter pointed out. The member 4 may be secured to the drill in one of several ways. For instance, as shown in Fig. 1, a collar 9, having upwardly-extending teeth 10, is fixed to the rod by screws 11, said teeth engaging the teeth 6 of member 4 and holding the same in a set position. Obviously the member 4 may be adjusted relatively to its coacting clutch member by releasing the screws 11 and changing the position of the collar 9. The collar may be dispensed with and screws 12 passed through one or more of the numerous openings 13 to bind against the drill to hold the member 4 in position, or, if desired, both the collar 9 and screws 12 can be employed at the same time. A further means for fixing the member 4 to the drill is shown in Fig. 3. This construction consists in providing a rib 15 on the drill and an engaging groove 16ª on the member 4 and a set-screw 17, the latter bearing against the drill, as clearly shown.

The several modified means for fixing the member 4 to the drill are all within the purview of my invention, my object being to make a construction which will absolutely fix the member after it has been set, and yet permit of its being adjusted, that the teeth may be brought into proper position relative to the joint between the drill and drill-rod as well as the teeth of the movable clutch member.

The movable clutch member 16 is provided at its lower edge with alternate beveled teeth 17ª and seats 18 of exactly the same construction as those of the member 4. Member 16 is also provided with an internal groove 19, which receives a feather 20, fast with the drill-rod 2, which allows the member to be raised and lowered, but prevents its independent rotation. The drill-rod is threaded at 21, and engaging said threads is a nut 22, adapted to be screwed down hard on the upper end of the member 16. It will be observed that the meeting and meshing faces of the teeth and the respective seats of the members 4 and 16 straddle the joint 3, which distributes the strain when drilling to the two members and thence throughout the drill and rod and relieves the stress at particular points.

A device for locking a drill to its rod constructed and arranged as herein set forth is positive in action and possesses simplicity and durability.

By constructing the engaging teeth as shown it is not absolutely essential that they fit each other snugly, as will be seen by reference to Fig. 6 of the drawings. This may be occasioned by wear or a hurried coupling of the parts. In any event the invention is capable of being worked just the same. However, the best results are obtained when the teeth fit their seats nicely, as best shown in Fig. 1. It is for this purpose I have found it expedient to make what I have termed the "fixed" member capable of adjustment. Should the teeth wear a little and a slight adjustment vertically be required, the member 4 can be moved up. Should a slight lateral adjustment be necessary, said member can be moved around on the drill, so that I have provided a way of adjusting the member 4 that it is always possible to make the teeth mesh properly to obtain the best results.

What I claim as new is—

1. A device for connecting a drill with its rod, consisting of an adjustably-mounted member, means for fixing said member, teeth on one end of the said member, a movable member, means for locking the movable member against independent rotation, teeth on the movable member which engage the teeth of the other member, the teeth of the members overlapping the joint between the rod and drill, and a lock-nut for holding the teeth of the two members, into engagement with each other, substantially as described.

2. A device for connecting a drill with its rod, consisting of a member provided at one end with teeth, a fixed collar provided with teeth which engage the teeth of the member, teeth formed at the opposite end of the member, a movable member, means for locking the movable member against independent rotation, teeth on one end of the movable member which engage the teeth of the other member, said latter engaging teeth overlapping the joint between the drill and rod, and a lock-nut for holding the two members together, substantially as described.

3. A device for connecting a drill with its rod, consisting of a member provided at one end with teeth, and a series of adjacent openings, a fastening device engaging one of the openings, a fixed collar provided with teeth which engage the teeth of the member, teeth formed at the opposite end of the said member, a movable member, means for locking the movable member against independent rotation, teeth formed on the end of the movable member to engage the teeth of the other member, said latter engaging teeth overlapping the joint between the drill and rod, and a lock-nut for holding the two members together, substantially as described.

4. In combination, a drill, a rod connected thereto, an adjustable member on the drill, a series of alternately-arranged beveled teeth and seats at one end of the member, means for locking the member against rotation, a movable member formed with a groove, a series of alternately-arranged teeth and seats formed at one end of the said movable member, said teeth engaging the seats between the teeth of the other member, the teeth overlapping the joint between the drill and drill-rod, a feather on the drill-rod which engages the groove of the movable member, and a nut bearing on the upper end of the movable member to lock the two members together, substantially as described.

5. In combination, a drill, a drill-rod provided with screw-threads, an adjustable member fixed to the drill, a similar member slidably mounted but prevented from rotating on the drill-rod, means at the abutting ends of the two members for locking said members against independent rotation, and a nut engaging the threads on the drill-rod, said nut bearing on the movable member, substantially as described.

In testimony whereof I affix my signature in presence of two witnesses.

CHARLES H. GIESE.

Witnesses:
   B. E. LEWIS,
   C. W. SHINN.